(12) United States Patent
Merandat et al.

(10) Patent No.: US 7,808,300 B2
(45) Date of Patent: Oct. 5, 2010

(54) POWER REGULATION SCHEME FOR A HIGH VOLTAGE OUTPUT IN INTEGRATED CIRCUIT DEVICES

(75) Inventors: Marc Merandat, Venelles (FR); Stephane Ricard, Marseilles (FR); Jerome Pratlong, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/075,109

(22) Filed: Mar. 8, 2005

(65) Prior Publication Data

US 2006/0119418 A1   Jun. 8, 2006

(30) Foreign Application Priority Data

Dec. 8, 2004   (FR) .................... 04 13074

(51) Int. Cl.
G05F 1/10   (2006.01)
G05F 3/02   (2006.01)

(52) U.S. Cl. .................................... 327/536

(58) Field of Classification Search .......... 327/534, 327/535–537; 363/59–60
See application file for complete search history.

(56) References Cited

U.S. PATENT DOCUMENTS

| | | | | |
|---|---|---|---|---|
| 4,236,199 A * | 11/1980 | Stewart | ........................ | 363/60 |
| 4,933,827 A * | 6/1990 | Olivo et al. | ..................... | 363/60 |
| 5,029,282 A * | 7/1991 | Ito | .............................. | 327/536 |
| 5,258,662 A * | 11/1993 | Skovmand | ................... | 327/544 |
| 5,444,412 A * | 8/1995 | Kowalski | ..................... | 327/541 |
| 5,499,183 A * | 3/1996 | Kobatake | ..................... | 363/59 |
| 5,619,124 A * | 4/1997 | Lim | ............................ | 323/313 |
| 5,642,072 A * | 6/1997 | Miyamoto et al. | .......... | 327/535 |
| 5,708,420 A * | 1/1998 | Drouot | ........................ | 340/660 |
| 5,754,476 A * | 5/1998 | Caser et al. | ............. | 365/185.29 |
| 5,796,285 A * | 8/1998 | Drouot | ........................ | 327/306 |
| 6,060,918 A * | 5/2000 | Tsuchida et al. | ............. | 327/143 |
| 6,278,316 B1 * | 8/2001 | Tanzawa et al. | .............. | 327/536 |
| 6,297,687 B1 * | 10/2001 | Sugimura | .................... | 327/536 |
| 6,456,555 B2 * | 9/2002 | Sim et al. | ................... | 365/226 |
| 6,518,828 B2 * | 2/2003 | Seo et al. | ..................... | 327/534 |
| 6,577,514 B2 | 6/2003 | Shor et al. | ..................... | 363/59 |

(Continued)

FOREIGN PATENT DOCUMENTS

EP   0 350 462   1/1990

(Continued)

OTHER PUBLICATIONS

"International Application Serial No. PCT/US2005/040223, International Search Report mailed Jul. 10, 2006", 1 pg.

*Primary Examiner*—Quan Tra
(74) *Attorney, Agent, or Firm*—Schwegman, Lundberg & Woessner, P.A.

(57) ABSTRACT

A power regulation scheme for high voltage output in integrated circuits is realized in a regulated high voltage generator, a voltage clamp, and a power regulator connected between the voltage clamp and the voltage generator. The voltage clamp produces a clamp current during a voltage limiting operation. A regulating clamp current corresponds to an initial limit voltage of the clamp. The power regulator senses the clamp current and suspends voltage generation as the limit magnitude of clamp current is attained. The clamp current is mirrored in a current comparator circuit that triggers a stop signal to the regulated high voltage generator, thus saving power.

23 Claims, 6 Drawing Sheets

U.S. PATENT DOCUMENTS

| | | |
|---|---|---|
| 6,724,241 B1 | 4/2004 | Bedarida et al. .............. 327/536 |
| 6,798,274 B2 * | 9/2004 | Tanimoto .................... 327/536 |
| 6,903,599 B2 | 6/2005 | Chen et al. |
| 2003/0210089 A1 * | 11/2003 | Tanzawa et al. ............. 327/536 |
| 2004/0239408 A1 * | 12/2004 | Chen et al. .................. 327/536 |
| 2004/0257148 A1 * | 12/2004 | Tobita ........................ 327/536 |
| 2005/0073355 A1 | 4/2005 | Sivero et al. ................ 327/536 |

FOREIGN PATENT DOCUMENTS

| | | |
|---|---|---|
| EP | 0 655 827 | 5/1995 |
| JP | 06043952 A * | 2/1994 |
| WO | WO-2006062645 A2 | 6/2006 |

* cited by examiner

POWER REGULATION SCHEME FOR A HIGH VOLTAGE OUTPUT IN INTEGRATED CIRCUIT DEVICES

TECHNICAL FIELD

The invention relates to high voltage generators for regulated power output and use in integrated circuit devices.

BACKGROUND ART

In integrated circuit memory devices, a high voltage source or generator may be required for word line pumping or to supply a programming voltage in nonvolatile memories. The generator provides an output voltage greater than that required by a load device. A working voltage is determined by a limiting circuit connected in parallel with the high voltage generator and the load device. In a continuous operation, an output of a high voltage generator provides current sufficient to supply a load device at a limit voltage. Any current not used by the load device is shunted to ground by an output clamp current and is lost.

In reference to FIG. 1, a prior art high voltage generator 100 runs with a high logic level applied to an oscillator enable input 101. Once enabled, the oscillator 105 generates a clock signal at an oscillator output 107. The clock signal applied to a charge pump 110 generates a high voltage supply at a charge pump output 112. As the voltage generator 100 operates, a charge pump current 115 flows to supply a memory array 120 with an array current 125. The remainder of the charge pump current 115 is a clamp current 135, which flows through a high voltage clamp 130. The voltage at the charge pump output 112 rises until the high voltage clamp 130 reaches a limit voltage.

The high voltage clamp 130 is composed of a plurality of reverse biased zener diodes 140 connected in series with a plurality of forward biased zener diodes 145. With the clamp current 135 flowing through the high voltage clamp 130, the zener diodes 140, 145 reach device limit voltages and establish a clamp voltage as the high voltage supply at the charge pump output 112. Any current not used by the load device is shunted to ground through the high voltage clamp 130.

With reference to FIG. 2, a waveform diagram 200 of a typical high voltage generator includes an oscillator enable signal 201 transitioning to a high logic level at the oscillator enable input 101 (FIG. 1) at an oscillator enable time 250. The high logic level at the oscillator enable input 101 causes the oscillator 105 to generate a clock signal 207. The charge pump 110 receives the clock signal 207 and produces a high voltage supply 212. The high voltage supply 212 starts at a voltage between zero volts and the supply voltage and rises to the clamp voltage limit controlled by the high voltage clamp 130. The clamp voltage limit is reached at a high voltage clamp time 270, which defines a high voltage ramp time 260. Operation continues in a high voltage clamp region 280 for as long as a high logic level is maintained on the oscillator enable input 301. In the high voltage clamp region, the high voltage clamp 130 shunts to ground any current not necessary to supply the array current 125 and a minimum of the clamp current 135 for regulation.

Various attempts to improve regulation of a magnitude of high voltage output can be found. For example, U.S. Pat. No. 6,577,514 to Shor et al. describes an apparatus for providing a constant boosted voltage at the output of a charge pump. Further, U.S. Pat. No. 6,724,241 to Bedarida et al. describes a variable charge pump circuit to minimize voltage ripples of the pumped output.

An object of the invention is to devise a capability to sense when a desired high voltage supply level is attained, then suspend power generation and thus save power.

What is needed is a way of avoiding unused power generation. It is desirable to sense when sufficient power has been generated to sustain a high-voltage supply and maintain a level of optimal operation near that power delivery point.

DISCLOSURE OF INVENTION

The above object has been met with a regulated high voltage generator, a voltage clamp, and a power regulator connected between the voltage clamp and the voltage generator. The voltage clamp produces a clamp current during a voltage limiting operation. A regulating clamp current corresponds to an initial limit voltage of the clamp. A clamp current above this level occurs when a high voltage generator does not incorporate a power regulator and is operated in a continuous voltage generation mode. With this type of operation of an unregulated supply, the generator tries to produce voltage above the clamp limit and the clamp current increases in order to maintain a constant regulated voltage. The voltage limit of the clamp is maintained, but the additional power generated is wasted in the form of a shunt current to ground. In application, the power regulator senses the clamp current and suspends voltage generation as the limit magnitude of clamp current is attained. The clamp current is mirrored in a current comparator circuit that triggers a stop signal to the regulated high voltage generator. This suspension of voltage generation saves power that would otherwise be shunted to ground by excess clamp current.

MODES FOR CARRYING OUT THE INVENTION

Figure 1:
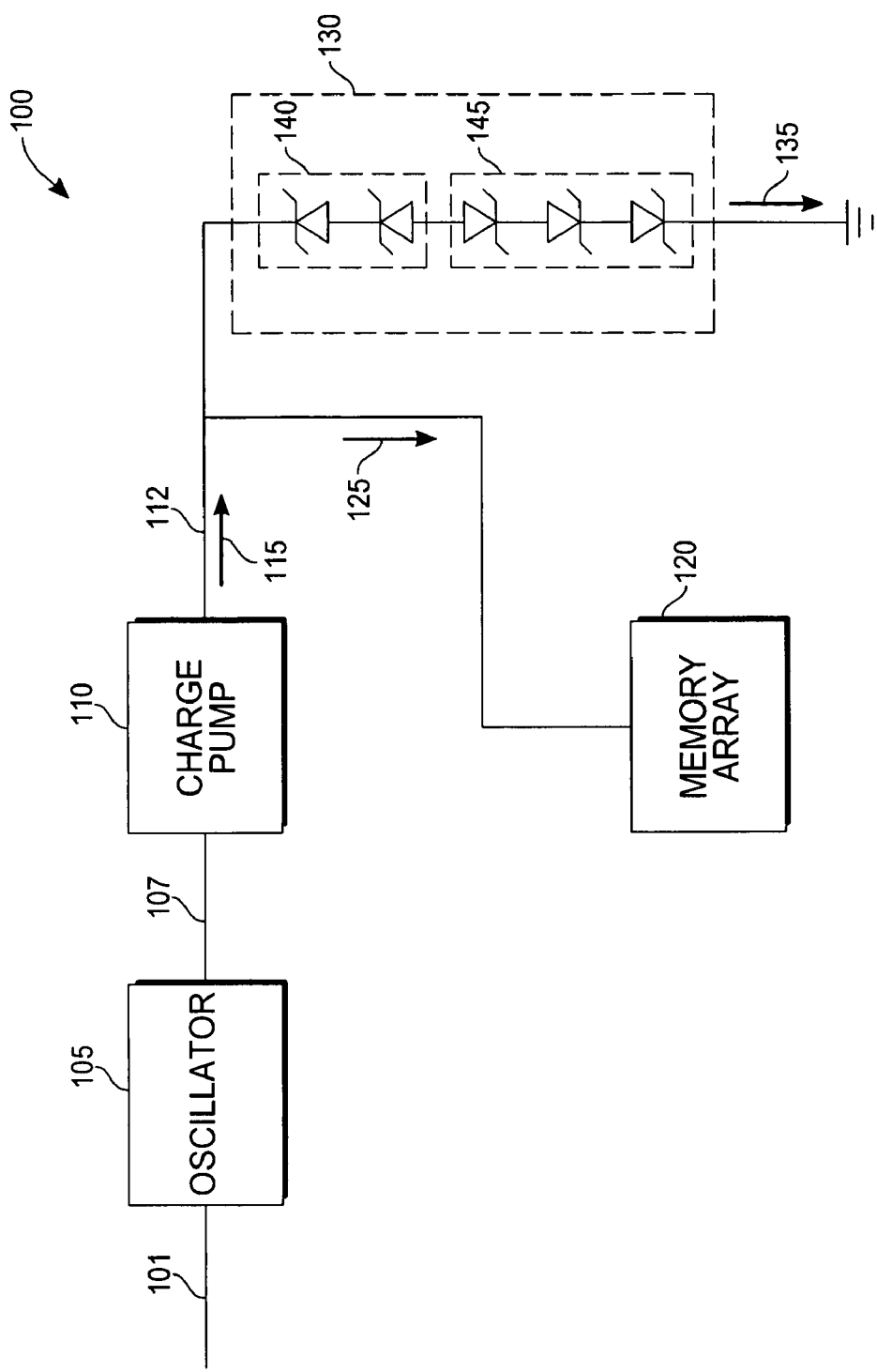
FIG. 1 is a block diagram of a prior art high voltage generator.
Figure 2:
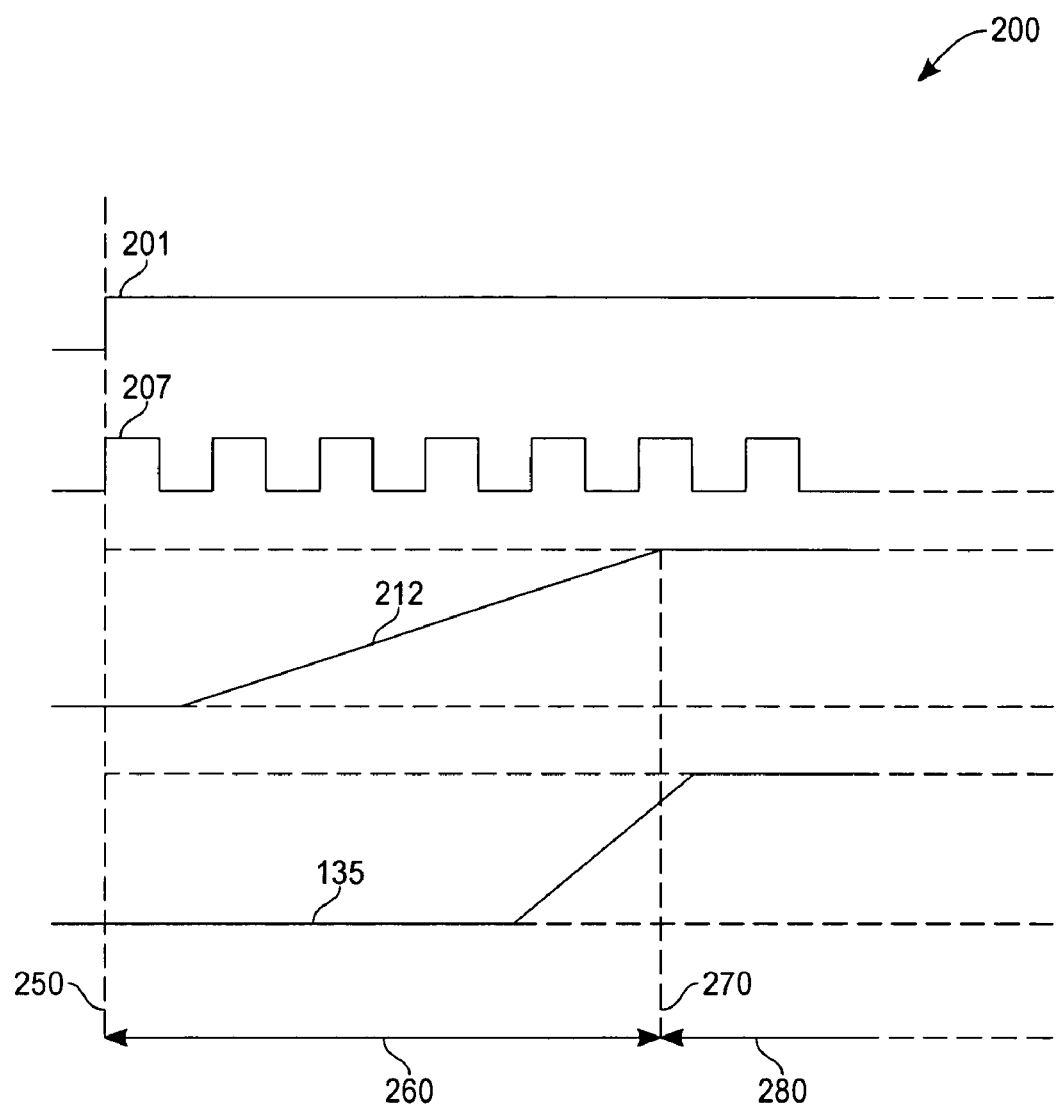
FIG. 2 is a waveform diagram of a prior art high voltage generator.
Figure 3:
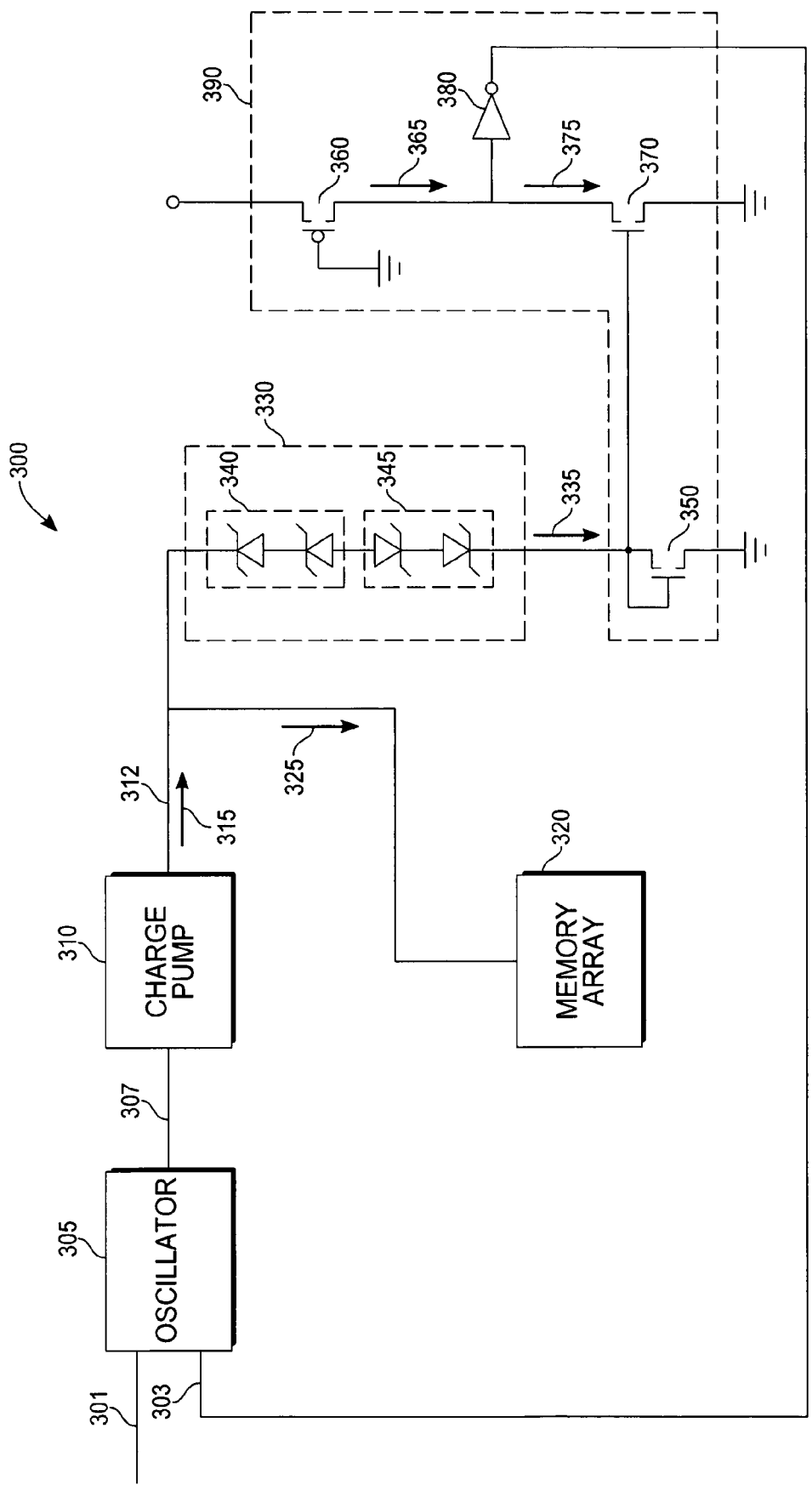
FIG. 3 is a block diagram of an exemplary high voltage generator of the present invention.

With reference to FIG. 3, a regulated high voltage generator 300 contains a gated oscillator 305 that generates a gated clock signal at an oscillator output 307 with application of a high logic level at an oscillator enable input 301 and a low logic level on a stop oscillator terminal 303. The gated clock signal applied to a charge pump 310 generates a high voltage at a charge pump output 312. As the regulated high voltage generator 300 commences operation, the charge pump current 315 supplies an array current 325 to, for example, a memory array 320. The remainder of the charge pump current 315 is a clamp current 335, which flows through a high voltage clamp 330. The voltage at the charge pump output 312 rises until reaching a limit of the high voltage clamp 330.

The high voltage clamp 330 is composed of a plurality of reverse biased zener diodes 340 connected in series with a plurality of forward biased zener diodes 345. With the clamp current 335 flowing through the high voltage clamp 330, the series connection of zener diodes 340, 345 reaches device limit voltages and establishes a clamp voltage as a high voltage supply at the charge pump output 312.

The high voltage clamp 330 is connected in series with a mirror voltage transistor 350 located within a power regulator 390. The mirror voltage transistor 350 conducts the clamp current 335 and produces a mirror voltage at an output of the mirror voltage transistor 350. The output of the mirror voltage transistor 350 connects to a gate input of a current mirror transistor 370. The current mirror transistor 370 connects in series with a current limiting transistor 360. A gate input of the current mirror transistor 370 is fed by the mirror voltage output from the mirror voltage transistor 350. The current mirror transistor 370 reproduces the clamp current 335 as a clamp mirror current 375. The current limit transistor 360 produces current to supply the clamp mirror current 375.

As the clamp mirror current 375 increases, the voltage across the current mirror transistor 370 decreases. A further increase in the mirror voltage increases the gate voltage at the current mirror transistor 370. The current mirror transistor 370 experiences an increasing gate to source voltage, yet the current conducted is constrained by a bounded magnitude of limit current 365. A further increasing mirror voltage causes a continual lowering of the drain-source voltage of the current mirror transistor 370 after the bounding value of the limit current 365 is reached. The decreasing drain-source voltage of the current mirroring transistor 370 is input to a buffer 380. The buffer 380 produces a stop oscillator signal by inverting a voltage input.

Therefore, a power regulation operation occurs as an increasing value of the clamp mirror current 335 produces an increasing mirror voltage. An increasing mirror voltage lowers the voltage across the current mirror transistor 370 and produces a low input to the buffer 380. The low input to the buffer 380 produces a logic high level of the stop oscillator signal. A high logic level of the stop oscillator signal causes the gated oscillator 305 to cease generation of the gated clock signal.

The current limiting transistor 360 connects to the supply voltage at a source node and connects to ground at a gate input creating a saturated load device. With no clamp mirror current 375 flowing, the current limiting transistor 360 holds the input of the buffer 380 at a high logic level. A high logic level at the input of the buffer 380 produces a low logic level for the stop oscillator signal and allows the gated oscillator 305 to run.

High voltage generation at the charge pump output 312 is terminated while the stop oscillator signal is at a logic high level. The high voltage at charge pump output 312 lowers slowly, the clamp current 335 lowers, and the mirror voltage at the output of the mirror voltage transistor 350 drops. With a diminishing mirror voltage, current mirror current 375 decreases and voltage at the input to the buffer 380 rises. A high voltage input to the buffer 380 causes the stop oscillator signal to go low and the gated oscillator 305 resumes operation. With the gated oscillator 305 operation restarted, high voltage generation resumes at the charge pump output 312 and a power regulation cycle iterates. The high voltage supplied at the charge pump output 312 remains approximately constant, varying by, for example, about 100 millivolts in a typical operation.

Figure 4:
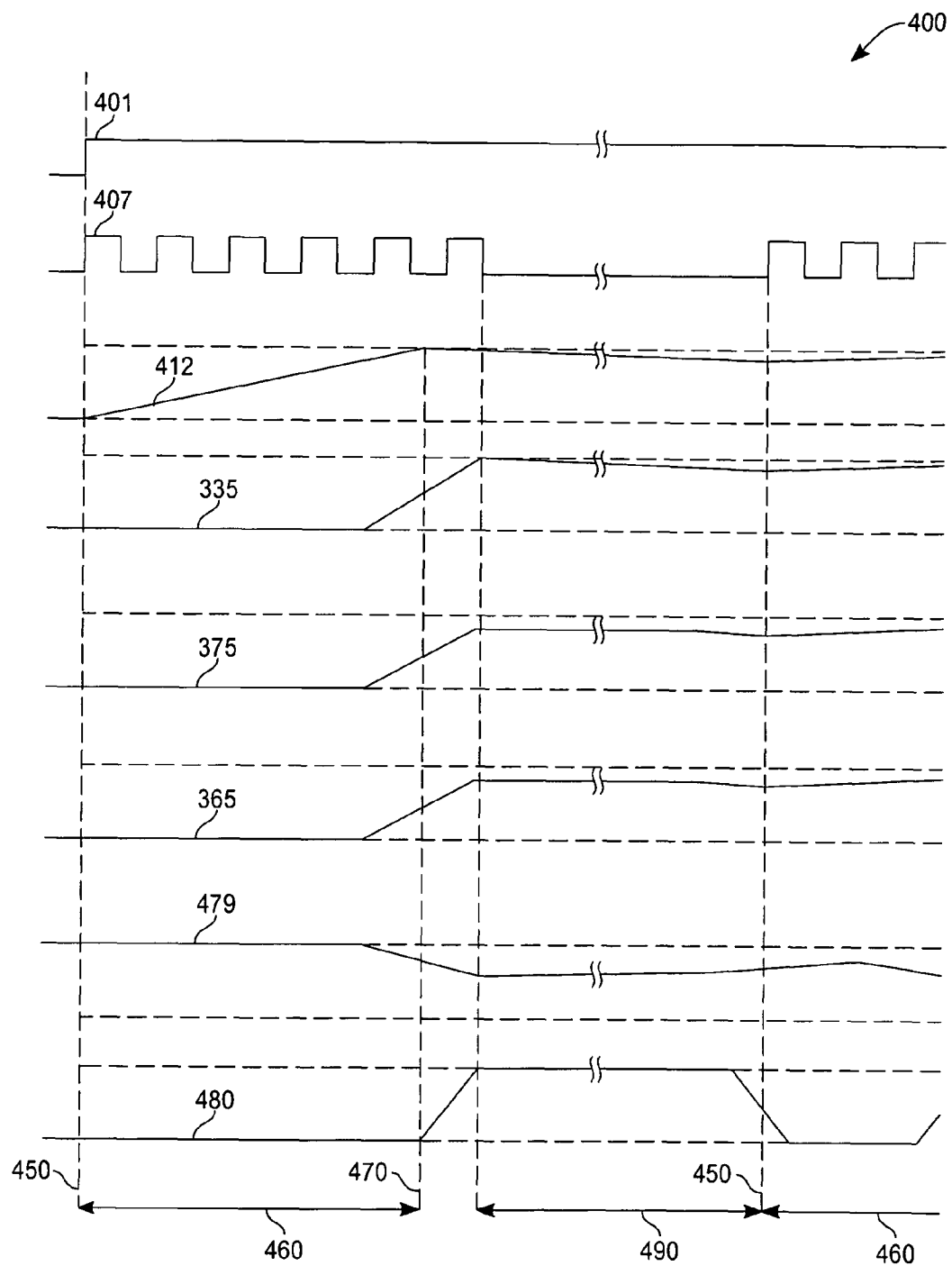
FIG. 4 is a waveform diagram of the high voltage generator of the present invention.

With reference to FIG. 4, a waveform diagram 400 of an exemplary regulated high voltage generator of the present invention includes the generation of a gated clock signal 407 as the oscillator enable signal 401 transitions to a high logic level with a low logic level of a stop oscillator signal 480 at an oscillator enable time 450. The charge pump 310 receives the gated clock signal 407 and produces a regulated high voltage 412 at the charge pump output 312 (FIG. 3). The regulated high voltage 412 starts at a voltage between zero volts and the supply voltage and rises to a clamp voltage limit controlled by the high voltage clamp 330. The clamp voltage limit is reached at a high voltage clamp time 470. The period that the regulated high voltage 412 rises from an initial voltage to the clamp voltage limit at the high voltage clamp time 470 defines a high voltage ramp time 460.

As the regulated high voltage 412 approaches the clamp voltage limit, the clamp current 335 flows. The clamp current 335 flowing through the mirror voltage transistor 350 produces a mirror voltage which is input to the current mirror transistor 370. The clamp mirror current 375 begins to flow through the current mirror transistor 370 with increasing mirror voltage. An amount of current equal to the current flowing through the current mirror transistor 370 begins to flow through the current limit transistor 360. A magnitude of current flowing through the current mirror transistor 370 increases until the current drawn equals an upper bound value of the limit current 365. The limit current 365 is configured so that the upper bound magnitude is less than or equal to an expected magnitude of the clamp current 335. The maximum current magnitude configuration ensures that a buffer input voltage 479 can be lowered to a magnitude less than a gate threshold of the buffer 380, triggering a high logic level of the stop oscillator signal 480.

The stop oscillator signal 480 going high causes the gated clock signal 407 coming from the gated oscillator 305 to cease. The clamp current 335 decreases once the gated clock signal 407 stops. The regulated high voltage 412 remains approximately the same for a majority of an oscillator suspension time 490, described infra, but declines by, for example, when a few tens of millivolts during the oscillator suspension time 490. As the clamp current 335 decreases, the clamp mirror current 375 decreases and the buffer input voltage 479 begins to rise. Eventually the clamp current 335 decreases enough that the buffer input voltage 479 rises above the gate threshold of the buffer 380. At a sufficiently high value of the buffer input voltage 479 the stop oscillator signal 480 goes to a low logic level and the gated oscillator 305 commences operation. The period of time that the stop oscillator signal 480 is at a high logic level defines the oscillator suspension time 490. The oscillator suspension time 490 also defines the period that power is not used, and thus saved.

Figure 5:
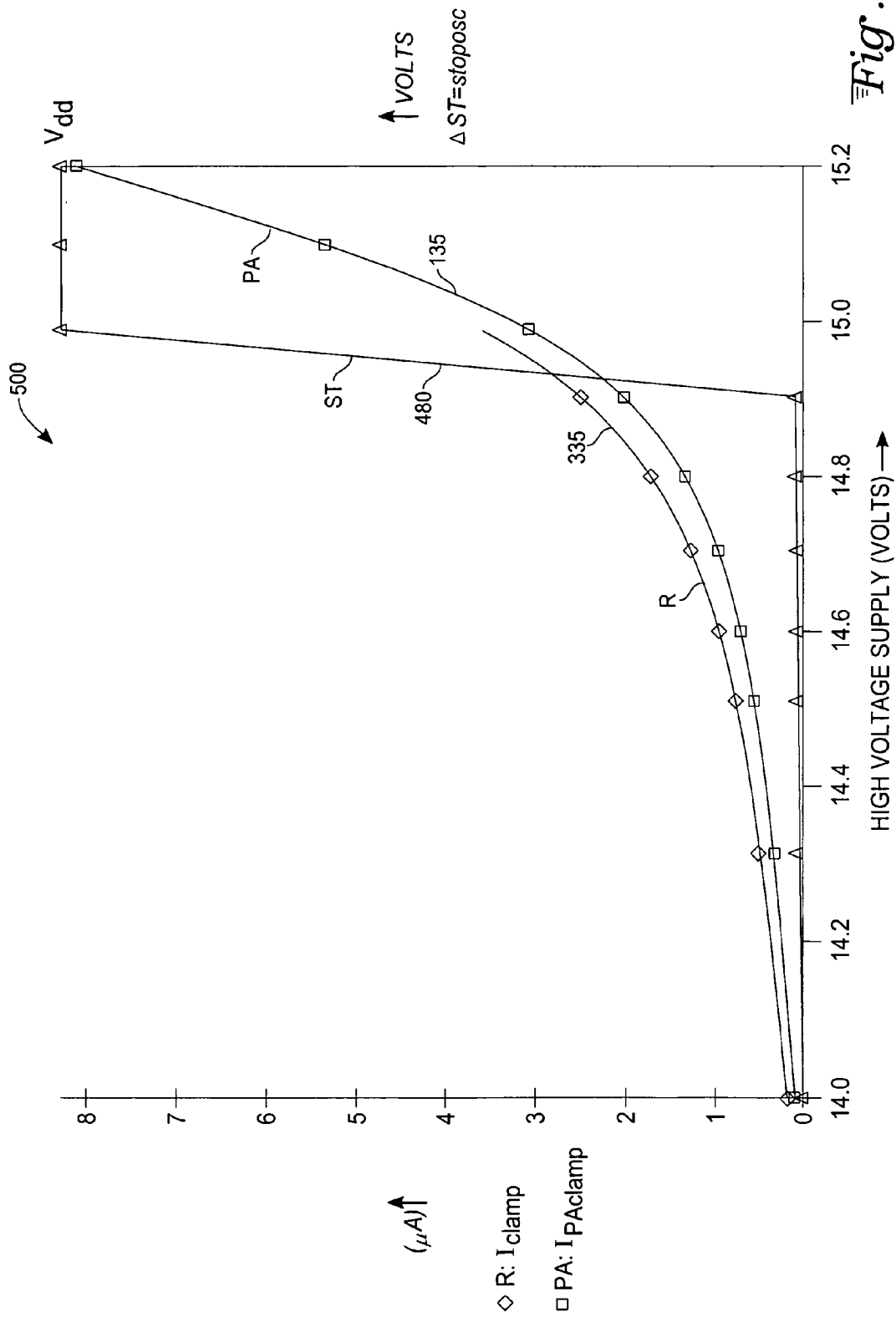
FIG. 5 is a high voltage supply versus clamp current diagram comparing a high voltage generator clamp current of the prior art and the present invention.

With reference to FIG. 5, a high voltage supply versus clamp current diagram 500 is based on the regulated high voltage 412 (FIG. 4) ranging from 14.0 volts to 15.2 volts along the abscissa of the diagram 500. The clamp current 135 ($I_{PAclamp}$) of the prior art, ranges from zero microamperes ($\mu A$) to approximately 8 $\mu A$ at a maximum value of high voltage supply. The clamp current 335 ($I_{clamp}$) of the present invention ranges from 0 $\mu A$ to approximately 3.5 $\mu A$ as a limit of approximately 15 volts is reached by the regulated high voltage 412. The stop oscillator signal 480 transitions from zero volts to $V_{dd}$ beginning at approximately 14.9 volts of high voltage supply. The transition of the stop oscillator signal 480 terminates the operation of the gated oscillator 305 (FIG. 3) causing a power savings and the upper limit of the clamp current 335 to be reached.

Figure 6:
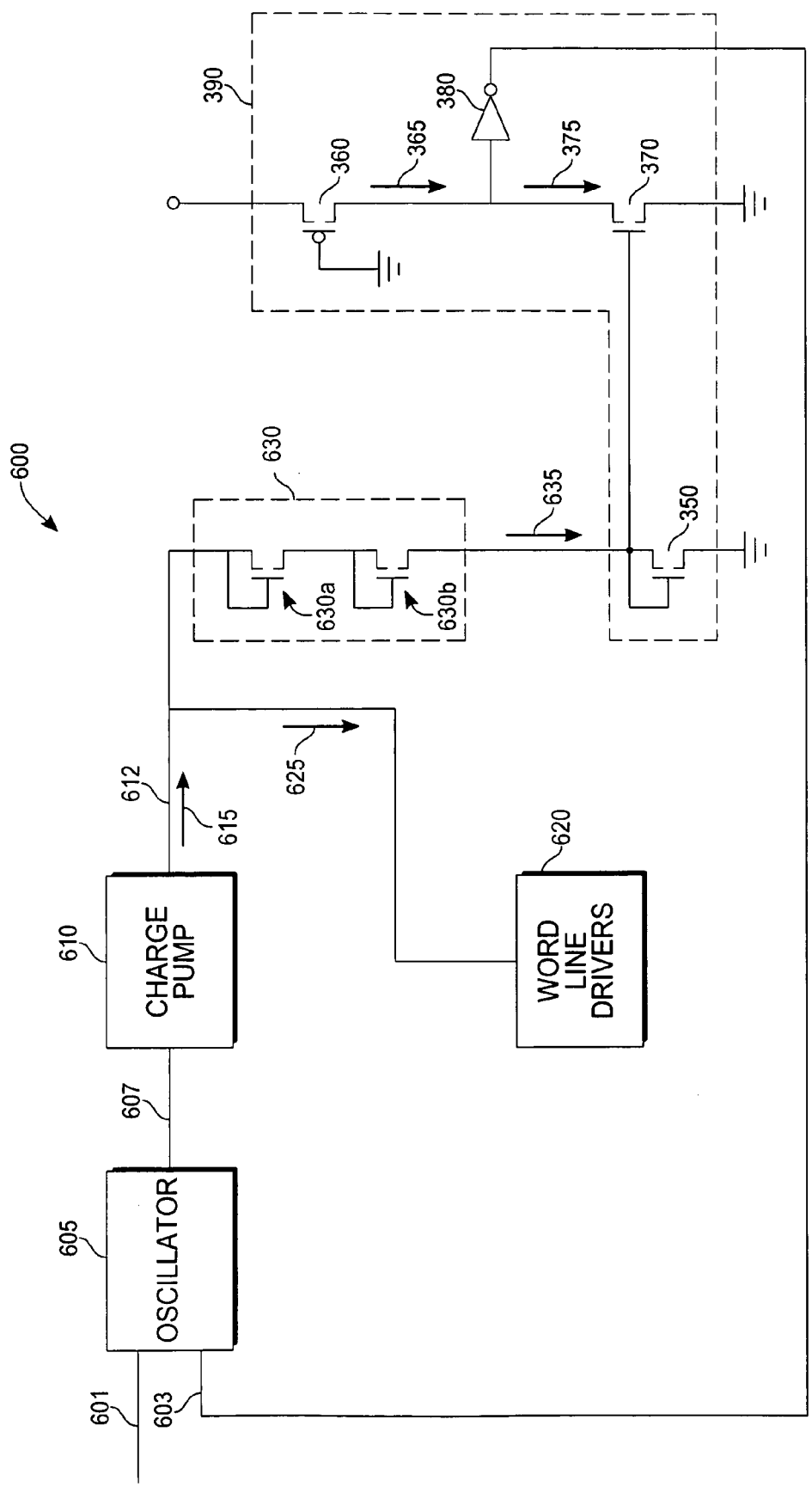
FIG. 6 is a block diagram of another exemplary embodiment of the present invention.

With reference to FIG. 6, a regulated wordline voltage generator 600 supplies a plurality of wordline drivers 620. The charge pump output 612 delivers a wordline current 625 to the plurality of wordline drivers 620. The remainder of the charge pump current 615 is an alternate clamp current 635 flowing to an alternate high voltage clamp 630. Voltage clamping devices 630a, 630b of the alternate high voltage clamp 630 are field effect transistors configured as saturation load devices. The mirror voltage transistor 350 is connected in series with the alternate high voltage clamp 630 and receives the alternate clamp current 635. The remainder of the power regulator 390 circuitry operates as in FIG. 3, described supra.

Although certain devices have been used in creating a high voltage power regulation device, a skilled artisan would recognize that alternative schemes and devices may be used to accomplish a similar result. For example, a power sensing circuit has been created from the mirror voltage transistor 350 connected in series with the high voltage clamp 330 producing a voltage output to the current mirror transistor 370. Additionally, the current mirror transistor 370 has been shown connected in series with the current limit transistor 360 with a supply voltage divided across them with their series connection node supplying a buffer device. A skilled artisan might craft a scheme of taking a tap voltage from the high voltage clamp 330, 630 to supply a voltage comparator composed of a differential amplifier to accomplish the same threshold sensing and switching result.

What is claimed is:

1. A high voltage generator comprising:
   a voltage generator configured to produce a regulated high voltage supply in response to a control signal;
   a voltage clamp comprising a plurality of reverse biased zener diodes connected in series with a plurality of forward biased zener diodes configured to limit a magnitude of said regulated high voltage supply and produce a clamp current that is determined only by the regulated high voltage supply applied to the voltage clamp; and
   a power regulator, comprising:
      a mirror voltage transistor configured to produce a mirror voltage reflecting a magnitude of said clamp current;
      a current limit transistor configured to produce a limit current; and
      a current mirror transistor configured to receive said mirror voltage, to generate a mirror current in response to said clamp current, said mirror current being constrained by said limit current, and to produce a control voltage;
   said power regulator configured to produce said control signal to change when the mirror current equals the limit current and the clamp current is increasing to terminate the production of the regulated high voltage supply.

2. The high voltage generator of claim 1, wherein said regulated high voltage supply upon attaining a given magnitude of voltage is configured to produce said clamp current through said voltage clamp.

3. The high voltage generator of claim 1, wherein said power regulator further comprises:
   a buffer configured to receive the control voltage and produce the control signal.

4. The high voltage generator of claim 1, wherein said voltage generator is configured to suspend said production of said regulated high voltage supply when said control signal indicates that said control voltage is less than said one threshold voltage and resume said production of said regulated high voltage supply when said control signal indicates that said control voltage is greater than said one threshold voltage.

5. A regulated high voltage system comprising:
   an oscillator configured to produce an oscillating signal in response to a control signal;
   a charge pump configured to produce a regulated high voltage supply utilizing the oscillating signal;
   a voltage clamp comprising a plurality of reverse biased zener diodes connected in series with a plurality of forward biased zener diodes configured to limit a magnitude of said regulated high voltage supply and to produce a clamp current, the clamp current being determined only by the regulated high voltage supply applied to the voltage clamp;
   a memory array configured to receive said regulated high voltage supply; and
   a power regulator comprising:
      a mirror voltage transistor configured to produce a mirror voltage reflecting a magnitude of said clamp current;
      a current limit transistor configured to produce a limit current; and
      a current mirror transistor configured to receive said mirror voltage, to generate a mirror current in response to said clamp current, said mirror current being constrained by said limit current, and to produce a control voltage based on said mirror current;
   a buffer configured to receive the control voltage and produce said control signal to change when the mirror current equals the limit current and the clamp current is increasing to terminate the production of the oscillating signal to suspend said production of said regulated high voltage supply.

6. The regulated high voltage system of claim 5, wherein said
   a buffer is an inverter.

7. A regulated high voltage system comprising:
   an oscillator configured to produce an oscillating signal in response to a control signal;
   a charge pump configured to produce a regulated high voltage supply utilizing the oscillating signal;
   a voltage clamp comprising a plurality of reverse biased zener diodes connected in series with a plurality of forward biased zener diodes configured to limit a magnitude of said regulated high voltage supply and produce a clamp current that is generated solely in response to the regulated high voltage supply applied to the voltage clamp;
   a memory array configured to receive said regulated high voltage supply; and
   a power regulator comprising:
      a mirror voltage transistor configured to produce a mirror voltage reflecting a magnitude of said clamp current;
      a current limit transistor configured to produce a limit current; and
      a current mirror transistor configured to receive said mirror voltage, to generate a mirror current in response to said clamp current, said mirror current being constrained by said limit current, and to produce a control voltage;
   said power regulator configured to produce said control signal to change when the mirror current equals the limit current and the clamp current is increasing to terminate the production of the oscillating signal.

8. The regulated high voltage system of claim 7, wherein said regulated high voltage supply upon attaining a given magnitude of voltage is configured to produce said clamp current through said voltage clamp.

9. The regulated high voltage system of claim 7, wherein said power regulator comprises:
   a buffer configured to receive the control voltage and produce the control signal.

10. The regulated high voltage system of claim 9, wherein said oscillator is configured to suspend production of said oscillating signal when said control signal indicates that said control voltage is less than said one threshold voltage and resume said production of said oscillating signal when said control signal indicates that said control voltage is greater than said one threshold voltage.

11. A high voltage generator comprising:
 a voltage generator configured to produce a regulated high voltage supply in response to a control signal;
 a voltage clamp comprising a plurality of reverse biased zener diodes connected in series with a plurality of forward biased zener diodes configured to limit a magnitude of said regulated high voltage supply and produce a clamp current, wherein the clamp current is generated solely in response to the regulated high voltage supply applied to the voltage clamp; and
 a power regulator comprising:
  means for producing a control voltage from a magnitude of said clamp current and a limit current; and
  means for producing said control signal to change when the clamp current equals the limit current and the clamp current is increasing to terminate the production of the regulated high voltage supply.

12. The high voltage generator of claim 11, wherein said regulated high voltage supply upon attaining a given magnitude of voltage is configured to produce said clamp current through said voltage clamp.

13. The high voltage generator of claim 11, wherein said voltage generator comprises a means for suspending said production of said regulated high voltage supply when said control signal indicates that said control voltage is less than said one threshold voltage and resume said production of said regulated high voltage supply when said control signal indicates that said control voltage is greater than said one threshold voltage.

14. A high voltage generator comprising:
 a voltage generator configured to produce a regulated high voltage supply in response to a control signal;
 a voltage clamp comprising a plurality of reverse biased zener diodes connected in series with a plurality of forward biased zener diodes configured to limit a magnitude of said regulated high voltage supply and produce a clamp current, wherein the clamp current is generated solely in response to the regulated high voltage supply applied to the voltage clamp; and
 a power regulator configured to:
  receive said clamp current;
  produce a limit current;
  generate a mirror current in response to said clamp current, said mirror current being constrained by said limit current;
  produce a control voltage based on said mirror current; and
  produce said control signal to change when the mirror current equals the limit current and the clamp current is increasing to terminate the production of the regulated high voltage supply.

15. The high voltage generator of claim 14, wherein said regulated high voltage supply upon attaining a given magnitude of voltage is configured to produce said clamp current through said voltage clamp.

16. The high voltage generator of claim 14, wherein said voltage generator is further configured to suspend said production of said regulated high voltage supply when said control signal indicates that said control voltage is less than said one threshold voltage and resume said production of said regulated high voltage supply when said control signal indicates that said control voltage is greater than said one threshold voltage.

17. The high voltage generator of claim 1, wherein said voltage generator comprises:
 an oscillator; and
 a charge pump coupled to said oscillator.

18. The high voltage generator of claim 1 further comprising:
 a load device configured to receive said regulated high voltage supply.

19. A high voltage generator comprising:
 a voltage generator configured to produce a high voltage in response to a control signal;
 a voltage clamp comprising a plurality of reverse biased zener diodes connected in series with a plurality of forward biased zener diodes configured to limit a magnitude of said high voltage to a clamp voltage and to generate a clamp current from the high voltage; and
 a power regulator configured to produce the control signal from a comparison of said clamp current with a limit current produced by the power regulator, the power regulator configured to change the control signal when the clamp current equals the limit current and the clamp current is increasing to terminate the production of the high voltage.

20. The regulated high voltage system of claim 7, wherein said oscillator is to suspend production of said oscillating signal when said control signal indicates that said control voltage is less than said one threshold voltage and resume said production of said oscillating signal when said control signal indicates that said control voltage is greater than said one threshold voltage.

21. The regulated high voltage system of claim 8, wherein said oscillator is to suspend production of said oscillating signal when said control signal indicates that said control voltage is less than said one threshold voltage and resume said production of said oscillating signal when said control signal indicates that said control voltage is greater than said one threshold voltage.

22. The high voltage generator of claim 1, wherein an upper bound magnitude of said limit current is configured to be less than or equal to an expected magnitude of said clamp current.

23. The regulated high voltage system of claim 5, wherein an upper bound magnitude of said limit current is configured to be less than or equal to an expected magnitude of said clamp current.

* * * * *